United States Patent
Fischer

[11] Patent Number: 5,685,056
[45] Date of Patent: Nov. 11, 1997

[54] METHOD OF MOUNTING AN EMBLEM TO THE COVER OF A GAS BAG RESTRAINING SYSTEM IN VEHICLES

[75] Inventor: Anton Fischer, Heuchlingen, Germany

[73] Assignee: TRW Repa GmbH, Alfdorf, Germany

[21] Appl. No.: 710,006

[22] Filed: Sep. 11, 1996

Related U.S. Application Data

[63] Continuation of Ser. No. 377,185, Jan. 24, 1995, abandoned.

[30] Foreign Application Priority Data

Feb. 22, 1994 [DE] Germany ............... 94 02 922.9

[51] Int. Cl.⁶ .................. B21D 39/00; B60R 21/16
[52] U.S. Cl. ........................ 29/512; 280/728.3
[58] Field of Search ................. 29/512, 525.06; 280/728.1, 728.3, 731, 732, 770

[56] References Cited

U.S. PATENT DOCUMENTS

| | | |
|---|---|---|
| 2,756,572 | 7/1956 | Yeager et al. .................. 29/512 |
| 5,285,873 | 2/1994 | Arbesman ...................... 29/512 |
| 5,294,147 | 3/1994 | Edge ........................... 280/728.3 |
| 5,529,336 | 6/1996 | Eckhout ........................ 280/728.3 |

FOREIGN PATENT DOCUMENTS

| | | |
|---|---|---|
| 1891162 | 7/1962 | Japan . |
| 8334916 | 8/1983 | Japan . |
| 6227212 | 2/1987 | Japan . |
| 0266353 | 5/1990 | Japan . |
| 5139231 | 6/1993 | Japan . |

*Primary Examiner*—David P. Bryant
*Attorney, Agent, or Firm*—Tarolli, Sundheim, Covel Tummino & Szabo

[57] ABSTRACT

A cover plate for a gas bag restraining system has a badge bearing an emblem fixed on its front side. The badge has a tubular rivet formed thereon which extends through the cover plate and whose free terminal section is rolled over at the rear side of the cover plate. The rolled over terminal section of the tubular rivet is curved convexly and is directed toward the rear side of the cover plate.

4 Claims, 2 Drawing Sheets

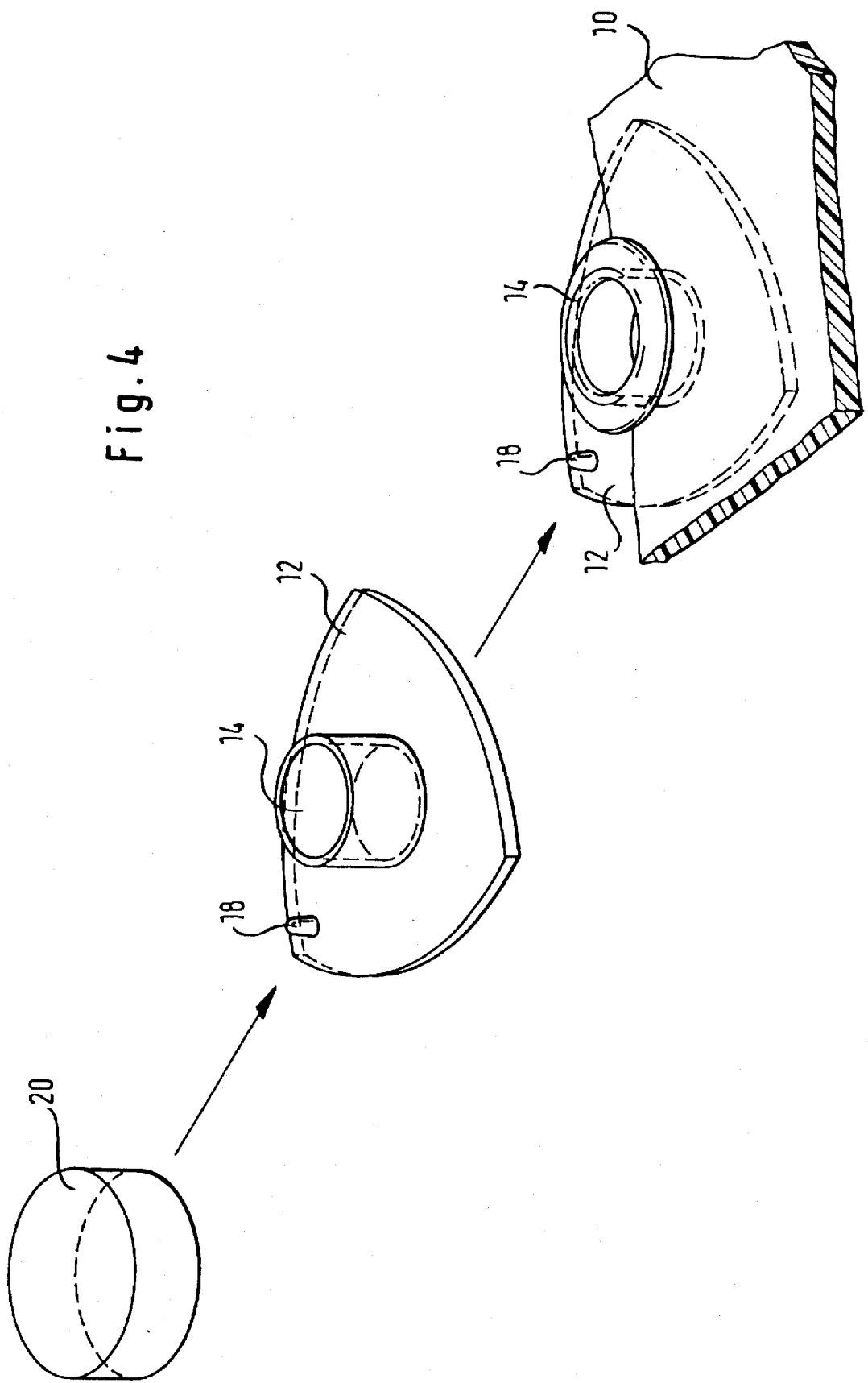

METHOD OF MOUNTING AN EMBLEM TO THE COVER OF A GAS BAG RESTRAINING SYSTEM IN VEHICLES

This is a continuation of application Ser. No. 08/377,185 filed on Jan. 24, 1995 now abandoned.

The invention relates to a cover for a gas bag restraining system in a vehicle comprising a cover plate, on which a badge bearing an emblem is fixed.

Conventionally a badge is secured to the cover plate of such cover by means of stamped sheet metal lugs or tags, which are rolled over at the rear side of the cover plate. In the case of such an attachment flush or flat arrangement of the rolled over lugs or tags is not always ensured. During deployment of the gas bag projecting edges on the bent lugs or tags may come into contact with the bag and catch thereon, damage to the bag then being likely.

The invention deals with this lack of security. In accordance with the invention the badge has at least one tubular rivet formed thereon, which extends through the cover plate and whose free terminal section is rolled over at the rear side of the cover plate. Preferably, the rolled over terminal section of the tubular rivet is convexly curved and directed toward the rear side of the cover plate. Owing to its being rolled over the free terminal or end section of the tubular rivet has a high dimensional rigidity. The edge at the end of the rolled over terminal section of the tubular rivet is set back toward the rear side of the cover plate and is unable to come into contact with the gas bag in the process of deployment. Damage to the gas bag by the rolled over terminal section of the tubular rivet is out of the question. This method of attachment is furthermore characterized by strong retaining forces.

The invention will now be described with reference to the drawings in more detail.

FIG. 4 shows a diagrammatic representation of the manufacture and attachment of a badge on the cover plate of the cover.

Figure 1:
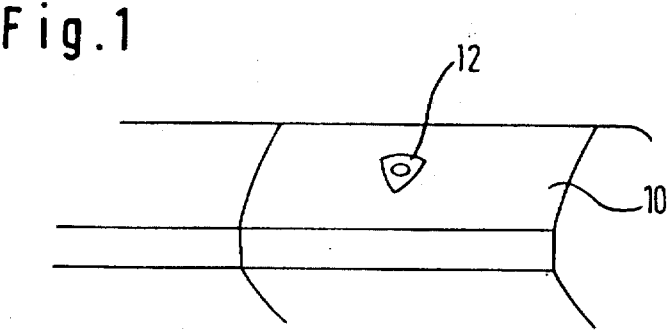
FIG. 1 shows a diagrammatic perspective elevation of a cover for a gas bag restraining system in a vehicle.
Figure 2:
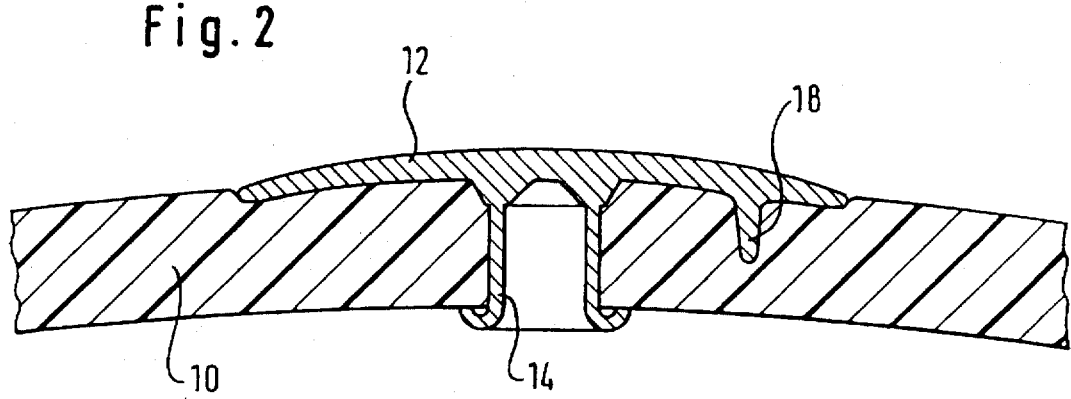
FIG. 2 shows a sectional view taken through a cover plate, on which the badge is fixed.

By way of example FIG. 1 shows a cover comprising a cover plate 10 as part of a gas bag restraining system for the co-driver side. On the front side, facing the occupant, of the cover plate 10 a badge 12 is secured, which is provided with an emblem or logo of a vehicle manufacturer.

The badge 12 is produced by flow pressing from a metal blank and on the rear side thereof facing the cover plate 10 it bears a tubular rivet 14 formed from its material, which extends through an opening in the cover plate 10. The free terminal section of the tubular rivet 14 is rolled over at the rear side of the rear side of the cover plate. The rolled over terminal section of the tubular rivet 14 has a convex shape and so directed toward the rear side of the cover plate 10 that the edges at the rim of the terminal section are in engagement with the rear side of the cover plate 10 and unable to touch a gas bag being deployed.

Figure 3:
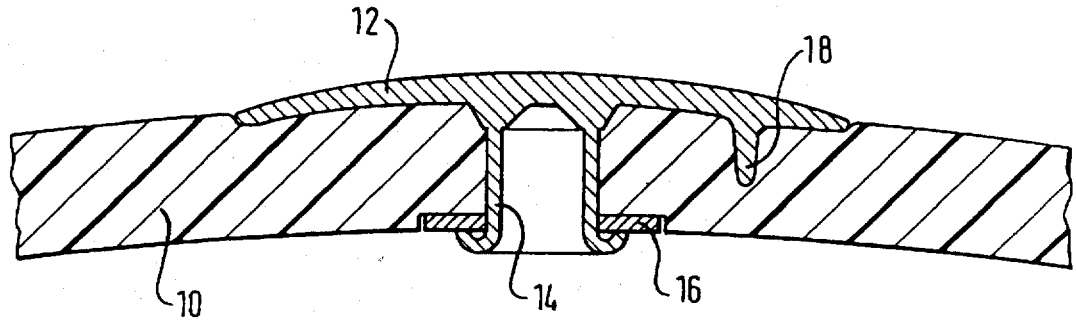
FIG. 3 shows a similar sectional view through a modified embodiment.

In the case of the modified embodiment illustrated in FIG. 3 an annular disk 16 or washer is inserted between the rolled over terminal section of the tubular rivet 14 and the rear side of the cover plate 10. This washer 16 means that there is a further increase in the holding force of the attachment.

In both designs the badge 12 is furthermore provided with a formed or molded pin 18 on its rear side facing the cover plate 10, such pin extending into a corresponding aligning hole at the front side of the cover plate. It is by means of this pin 18 that the emblem on the front side of the badge 12 is forced to assume its correct alignment.

FIG. 4 firstly shows a blank 20 of metal in the form of a round disk. From this blank 20 the badge 12 is produced by flow pressing, the tubular rivet 14 and the pin 18 being formed on the back side of the badge 12. Simultaneously the front side of the badge 12 is embossed in the desired fashion in order to form an emblem or the like thereon.

The badge 12 is then mounted on the cover plate 10 provided with a through hole for the tubular rivet 14 and an alignment hole of the pin 18 and the terminal section or end portion of the tubular rivet 14 is rolled over by means of a stamping tool. If required an annular disk is slipped over the free terminal section of the tubular rivet 14 in accordance with the design illustrated in FIG. 3.

Dependent on the size and shape of the badge several tubular rivets, like the tubular rivet 14, are formed on the rear side of the badge. If attachment is by several tubular rivets the pin 18 may be dispensed with.

I claim:

1. A method of providing a cover plate in a vehicular gas bag restraining system with a badge bearing an emblem, comprising the steps of:

providing a blank in the form of a metal disk, flow pressing said blank to provide a badge with a front face and a rear face with at least one tubular rivet formed thereon, embossing said front face to provide said front face with a desired emblem, providing a hole in said cover plate, inserting said tubular rivet through said hole so that a free terminal section of said rivet projects on a rear side of said cover plate, and engaging and rolling over said projecting free terminal section with a stamping tool on said rear side of the cover plate.

2. A method as set forth in claim 1, including convexly curling said projecting free terminal section and directing said projecting free terminal section toward said rear face of said badge.

3. A method as set forth in claim 1, including providing an annular disk between said projecting free terminal section and said rear face of said badge.

4. A method as set forth in claim 1, including providing a pin on said badge, providing an alignment hole in a front side of the cover plate, and engaging said pin into said alignment hole.

* * * * *